United States Patent [19]

Young

[11] Patent Number: 4,921,472
[45] Date of Patent: May 1, 1990

[54] CHAIN TENSIONER
[75] Inventor: James D. Young, Chesaning, Mich.
[73] Assignee: Borg-Warner Automotive Transmission & Engine Components Corporation, Troy, Mich.
[21] Appl. No.: 364,279
[22] Filed: Jun. 12, 1989
[51] Int. Cl.⁵ ............................................. F16H 7/08
[52] U.S. Cl. .................................... 474/111; 474/140
[58] Field of Search ................ 474/101, 109, 111, 140
[56] References Cited

U.S. PATENT DOCUMENTS 3,490,302  5/1968  Turner et al. ........................ 474/111

FOREIGN PATENT DOCUMENTS 1172716  12/1969  United Kingdom ................ 474/111

Primary Examiner—Thuy M. Bui
Attorney, Agent, or Firm—Charles R. Schaub; Greg Dziegielewski

[57] ABSTRACT

A chain tensioner particularly for use in confined spaces having a blade spring mechanically interlocked with a plastic shoe. The plastic shoe engages the chain to be tensioned and the shoe may be made of a rigid heat stabilized nylon.

20 Claims, 3 Drawing Sheets

CHAIN TENSIONER

BACKGROUND OF THE INVENTION

This invention relates to a chain tensioner for chain drives in general which is particularly though not exclusively suitable to use as a tensioner on the timing chain of a motor vehicle engine.

The present invention is based on the utilization of a synthetic plastic material that will "creep" under load and elevated temperature. One form of chain tensioner embodying this principal is disclosed in our British Patent No. 986,174 but this form of construction is only of limited application for use in confined spaces. Another example of this type of chain tensioner is shown in our U.S. Pat. No. 3,490,302. It is an aim of this invention to provide a simple, compact, reliable, and easy to manufacture chain tensioner.

However, these prior art chain tensioners have manufacturing and installation limitations that make the parts more expensive to manufacture and assemble. In one such prior art chain tensioner the blade spring has a triangular aperture at one end that must be aligned with a triangular projection on the shoe. When the triangular projection is entered into the triangular aperture a split pin is inserted into a bore in the projection to mechanically interlock the blade spring on the shoe. A small misalignment of the components can prevent the tensioner from being properly assembled. Accordingly, there is a need for a simplified chain tensioner that is easy to manufacture and assemble.

SUMMARY OF THE INVENTION

According to the invention, a chain tensioner is provided comprising a blade spring in mechanically interlocked association with a shoe. The shoe is adapted to contact the chain to be tensioned and the shoe is made of a synthetic plastic material that will "creep" under load and elevated temperature.

The spring is preferably mechanically interlocked with the plastic shoe. For this purpose the plastic shoe has a chamber at one end to receive an end of the blade spring. A passageway is provided at the other end of the shoe for receiving the other end of the blade spring. The passageway has a shoulder that engages the end of the blade spring. The end wall of the chamber and the shoulder act to retain the blade spring in the chamber and the passageway. A wall or centrally located rib in the chamber and a projection in the passageway can be provided to engage a slot on each end of the blade spring to further assist with interlocking the blade spring to the plastic shoe. The term "mechanical interlock" defines an interlock that is achieved by the geometrical configuration of the parts so interlocked. The phrase as used herein does not comprehend bonding by adhesives, molding, or a connecting by riveting, bolting or screwing.

DESCRIPTION OF THE PREFERRED EMBODIMENT

Figure 1:
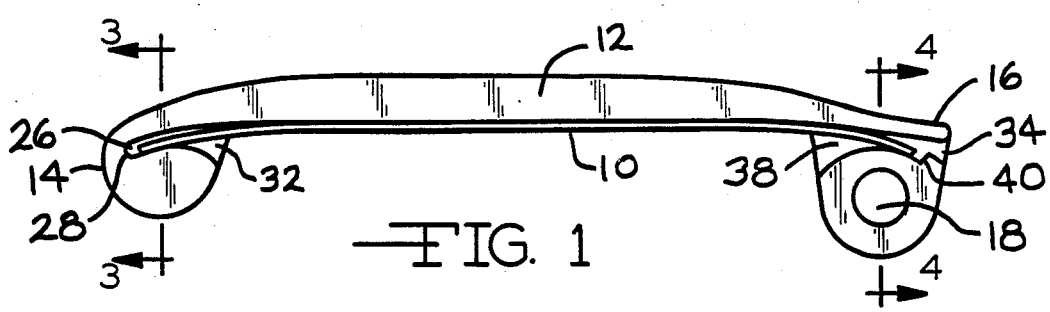
FIG. 1 is a side elevation of a chain tensioner according to the invention.
Figure 2:
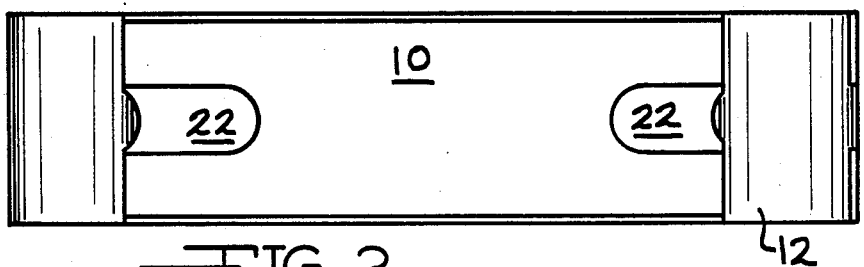
FIG. 2 is a bottom view of the chain tensioner of claim 1.
Figure 3:
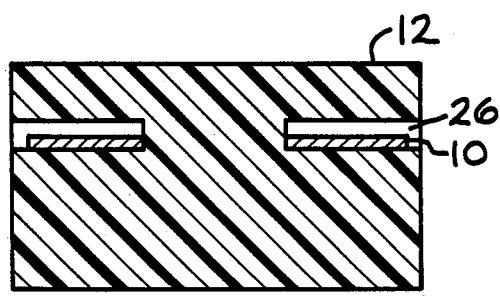
FIG. 3 is a cross-sectional view taken along line 3—3 in FIG. 1.
Figure 4:
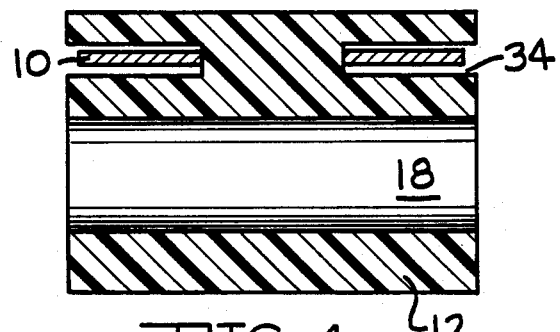
FIG. 4 is a cross-sectional view taken along line 4—4 in FIG. 1.

The present invention is directed to a chain tensioner that utilizes a synthetic plastic material that will "creep" under load and elevated temperature. Features of a chain tensioner utilizing such a synthetic plastic material are set forth in our prior U.S. Pat. No. 3,490,302 and the teachings of this patent are hereby incorporated by reference in this patent application. The features of the invention will be more fully understood by referring to the above-described drawings in connection with the following description of the invention.

The chain tensioner has a blade spring 10 in association with but not bonded to a chain-contacting shoe 12 of a rigid synthetic plastic material. The rigid synthetic plastic material is one which will creep under load and elevated temperture, and the load is provided by the blade spring 10. The synthetic plastic material of the shoe 12 is preferably a heat stabilized nylon 6/6.

The shoe 12 has a first end 14 and a second end 16. A bore 18 is positioned in the second end of the shoe 12 to receive a bolt or pivot pin for attaching the shoe to a suitable support to position the chain tensioner in the proper relation to the chain drive with which the chain tensioner is to be used. The first end 14 of the shoe 12 is adapted to bear against and slide on a relatively smooth support when the chain tensioner is in use.

Figure 5:
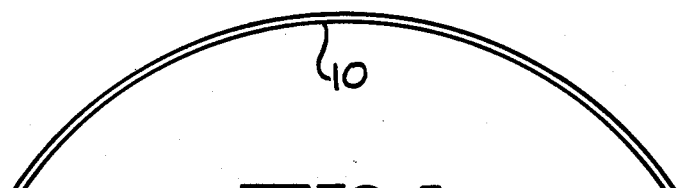
FIG. 5 is a side elevation view of the blade spring.
Figure 6:
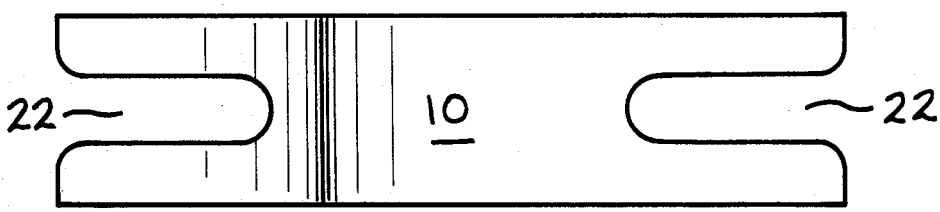
FIG. 6 is a plan view of the blade spring.
Figure 7:
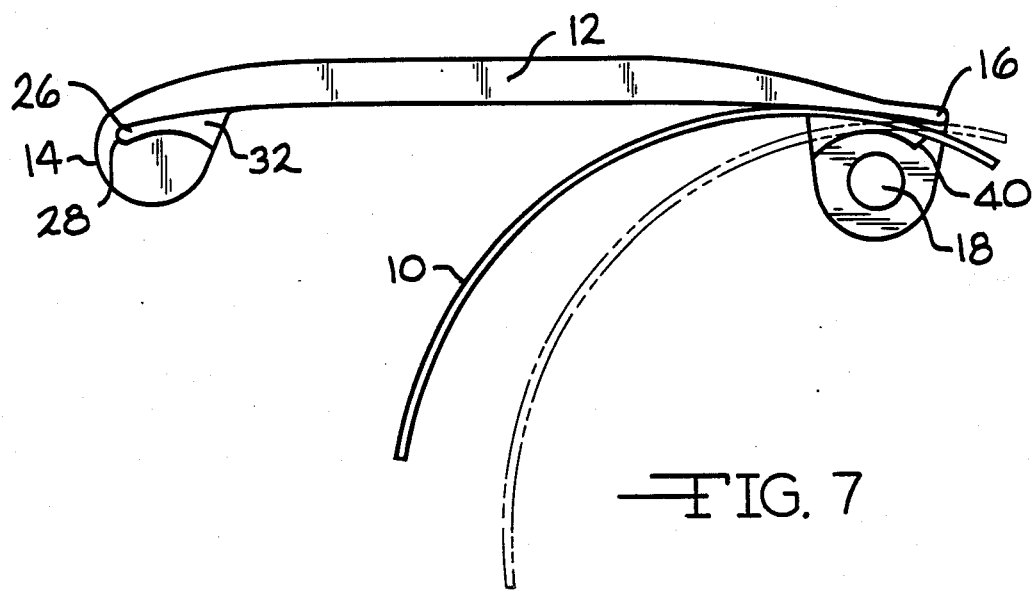
FIG. 7 is a side elevation view showing the installation of the blade spring.
Figure 8:
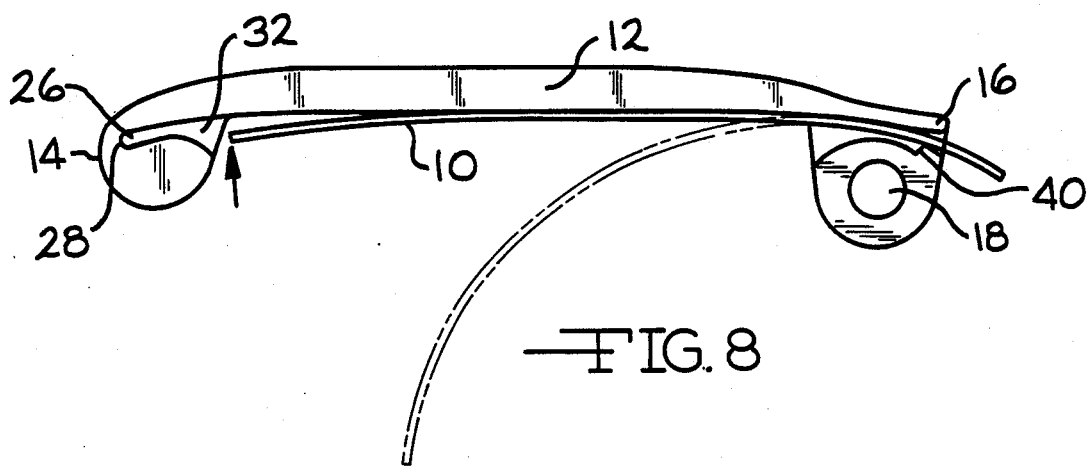
FIG. 8 is a side elevation view showing the installation of the blade spring.
Figure 9:
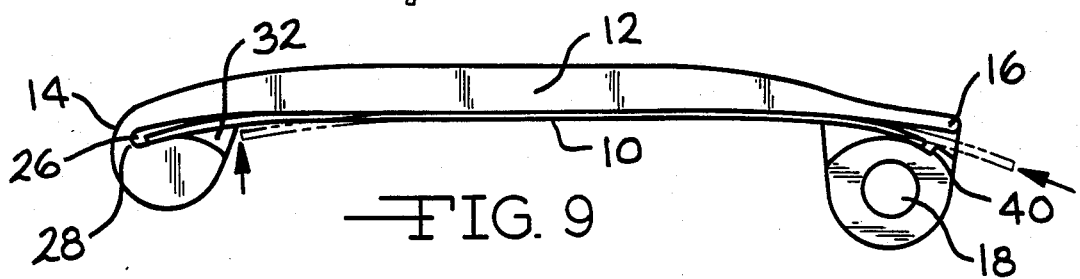
FIG. 9 is a side elevation view showing the installation of the blade spring.
Figure 10:
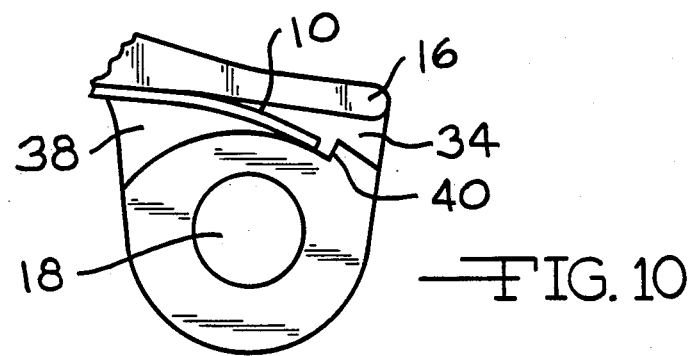
FIG. 10 is an enlarged view of one end of the chain tensioner.

As shown in FIGS. 5 and 6, the blade spring 10 is arcuate in form and has a recess or slot 22 located at each end. The slot 22 extends from the outer end of the blade spring 10 towards the center of the blade spring. Usually, the slots 22 are centrally located along the longitudinal axis of the blade spring 10. The ends of the slots 22 at the ends of the blade spring 10 are slightly radiused to facilitate the insertion of other components into the slot. The slots 22 are easy to form in the blade spring 10. The slots 22 are substantially the same size and in substantially the same location on each end of the blade spring 10 so that the blade spring is substantially symmetrical and can be used either way on the shoe 12.

The plastic shoe 12 has a chamber 26 located on the first end 14 of the shoe. The chamber terminates at an end wall 28. A wall 32 is positioned in the interior of the chamber 26 and the wall is disposed for receiving a slot 22 on the blade spring 10. The second end 16 of the shoe 12 has a passageway 34 for receiving one end of the blade spring 10. A projection 38 is positioned in the passageway 34 for engaging a slot on one end of the blade spring 10. A shoulder 40 is positioned in the passageway 34 and the shoulder is disposed to engage the end of the blade spring 10 to mechanically interlock the blade spring to the shoe 12.

The length of the blade spring 10 is slightly less than the distance from the end wall 28 of the chamber 26 to the shoulder 40 in passageway 34. The wall 32 and the projection 38 both have a width that is slightly smaller than the width of the slot 22 that is positioned at each end of the spring blade 10. The length of the slots 22 must be sufficient to allow the blade spring 10 to be positioned in the shoe 12.

As shown in FIGS. 7-10, one end of the blade spring 10 is positioned in the passageway 34 located on the second end 16 of the shoe 12. The projection 38 in the passageway 34 extends into the slot 22 located on that end of the blade spring 10. The end of the blade spring is advanced into the passageway beyond the shoulder 40 for a distance sufficient to allow the other end of the blade spring to be advanced towards the shoe 12 and inserted into the chamber 26. The slots 22 on each end of the blade spring 10 are sufficiently long to allow the blade spring to be so inserted into the passageway 34. When the other end of the blade spring is in alignment with the chamber 26, the blade spring 10 is advanced towards the end wall 28 of the chamber 26 to insert this end of the blade spring in the chamber. The wall 32 in the chamber extends into the slot 22 of the blade spring 10. The radiused ends of the slots 22 make it easier to align the slots with the wall 32 and the projection 38 as the blade spring 10 is positioned on the shoe 12. When the blade spring has been advanced almost all the way into the chamber 26 the end of the blade spring 10 in the passageway 34 will move past the shoulder 40. Due to the arcuate shape of the blade spring 10 the end of the blade spring in the chamber 26 and the end of the blade spring in the passageway 34 are slightly curved. The curvature of the blade spring 10 brings the end of the blade spring into alignment with the shoulder 40 and into contact with the reaction surface 41 in the passageway 34. In this manner the end wall 28 of the chamber 26 and the shoulder 40 in the passageway 34 act as stops to define the range of movement of the blade spring 10 in an axial direction. It should be noted that the shoulder 40 is positioned so that the other end of the blade spring 10 cannot be removed from the chamber 26 unless the end of the blade spring in the passageway 34 is deflected to allow the blade spring to move past the shoulder 40 in a direction away from the end wall 28. The end wall 28 of the chamber 26 and the shoulder 40 in passageway 34 act to mechanically interlock the blade spring 10 to the shoe 12.

The wall 32 and the projection 38 engage the slots 22 on the blade spring 10 when the blade spring is properly positioned on the shoe 12. The wall 32 and projection 38 act to prevent transverse movement of the blade spring 10 with respect to the shoe 12. The wall 32 and the projection 38 also assist in mechanically interlocking the blade spring 10 to the shoe 12.

The blade spring 10 is very easy to position on the shoe 12. The symmetrical design of the blade spring 10 means the blade spring cannot be installed in the wrong orientation. It is also very easy to insert the blade spring into the passageway 34 and the chamber 26 of the shoe 12 and the slots 22 are easily aligned with the wall 32 and projection 38. Once the blade spring 10 is in alignment with the chamber 26 it is only necessary to advance the blade spring towards the end wall 28 to position the end of the blade spring 10 in alignment with the shoulder 40 to mechanically interlock the blade spring with the shoe 12.

When the blade spring 10 is positioned in the shoe 12 as described above, the blade spring wants to return to its original arcuate shape and the blade spring presses against the adjacent surface of the shoe 12. Accordingly, the blade spring 10 places a load on the shoe 12 and this load assists in allowing the shoe to "creep" to keep proper tension on the chain. The forces exerted by the blade spring 10 on the chamber 26 and the reaction surface 41 in passageway 34 of the shoe 12 are substantially equal due to the symmetrical design of the blade spring. The stresses on the blade spring 10 are also substantially equal due to the symmetrical design of the spring and the similar manner in which each end of the spring is mounted or mechanically interlocked with the shoe 12.

It will be appreciated that an alternative device, other than wall 32 and projection 38, can be employed at the ends of the shoe 12. For example, lateral flanges could be positioned along the edges of the passageway 34 and the chamber 26. The ends of the blade spring would then be correspondingly sized to snuggly fit into the passageway 34 and the chamber 26. With such a modification it would no longer be necessary to have the slots 22 in the blade spring. Other modifications and equivalents will occur to one skilled in the art.

The invention can be applied with particular advantage to internal combustion engine timing devices having only a short run of chain between adjacent sprockets. The small forms of engines with push-rods are normally of this type.

Figure 11:
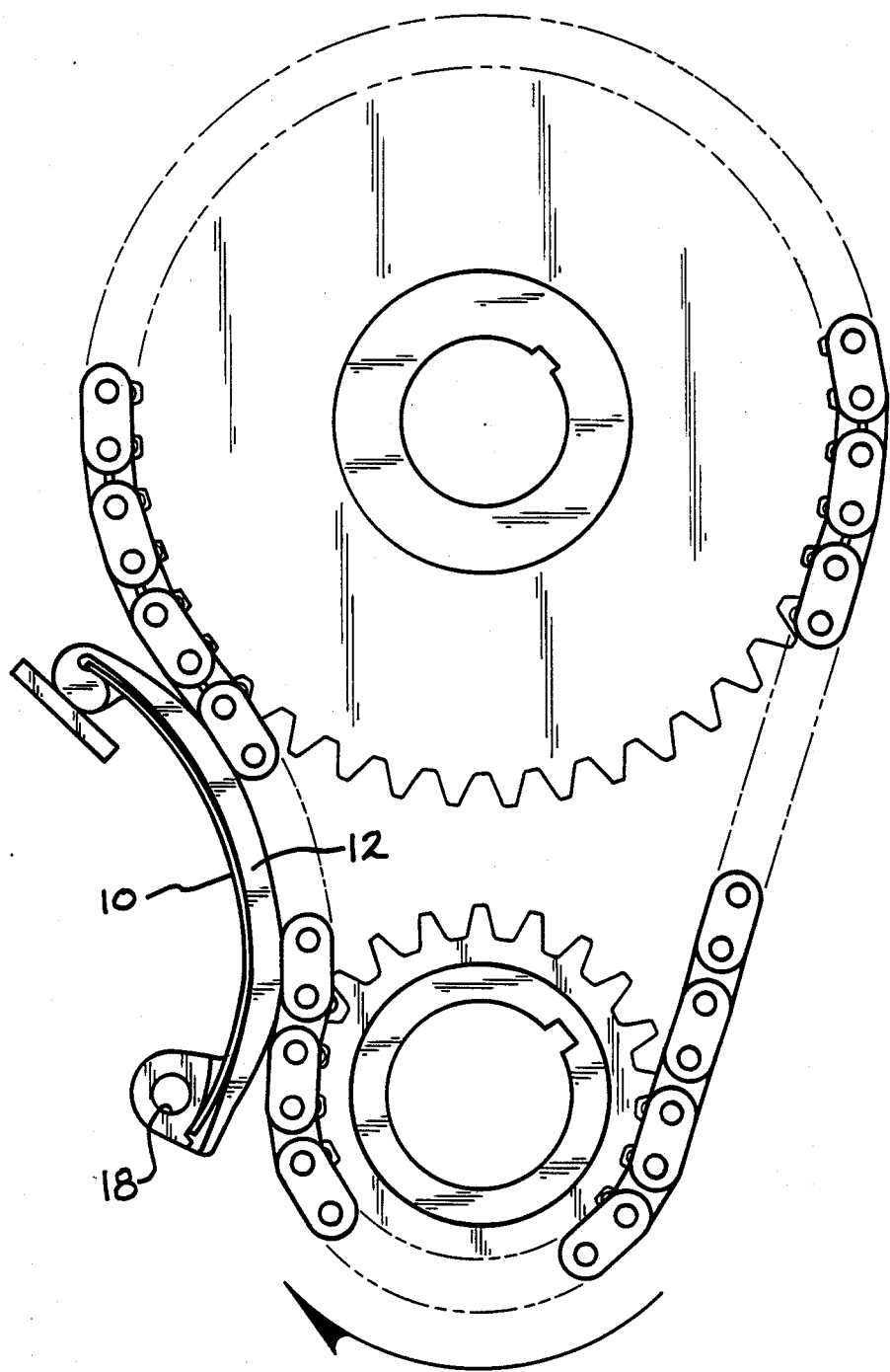
FIG. 11 is a side elevation view of the chain tensioner of the present invention being used to tension a chain.

FIG. 11 shows the chain tensioner in use to tension a timing chain of a motor vehicle engine. The shoe 12 is held in position against the chain 50 by the blade spring 10 to maintain the desired tension on the chain. The load placed on the shoe 12 by the blade spring 10 causes the shoe to "creep" to maintain the proper tension on the chain. The chain tensioner is pivotally mounted to the engine at base 18 and the first end 14 of the shoe 12 is in contact with the support surface 52. Of course the chain tensioner can be utilized to tension other types of chain.

It should be noted that this invention is fundamentally different in construction from the known form of blade spring chain tensioner in which a wear-resistant or other coating is provided on and bonded to the blade spring. In contrast to such a construction, the present invention involves the use of a normally rigid synthetic plastic material which is placed under stress by a blade spring and which, under such stress and elevated temperature occurring during operation of the invention, "creeps" to take up a configuration maintaining the tension of the chain.

The above description is given for the sake of explaining the basic features of the invention. Various substitutions and modifications, often than those cited, can be made without departing from the scope of the following claims.

I claim:
1. A chain tensioner comprising:
 a blade spring; and,
 a shoe adapted to contact said chain to be tensioned, said shoe being of a synthetic plastic material that will creep under load and elevated temperature, said shoe having a first end and a second end, said first end defining a chamber for receiving one end of said blade spring, said second end of shoe defining a passageway for receiving an end of said blade spring, said passageway having a means for engaging said end of said blade spring, said engagement means acting to limit movement of said blade spring, said engagement means being disposed to maintain said end of said blade spring in engage- ment with said chamber and said passageway to mechanically interlock said blade spring to said shoe by the geometric configuration of said blade spring and said shoe so as to place said shoe under stress and maintain tension on said chain.

2. The chain tensioner of claim 1, wherein said synthetic plastic material of said shoe is a rigid heat stabilized nylon.

3. The chain tensioner of claim 1, wherein said blade spring has a longitudinally extending slot positioned at each end of said blade spring, said slots extending from each end of said blade spring towards said center of said blade spring.

4. The chain tensioner of claim 3, wherein said chamber has a wall for engaging said slot at one end of said blade spring and said passageway has a projecting for engaging said slot at the opposite end of said blade spring.

5. The chain tensioner of claim 4, wherein said means for engaging said end of said blade spring is a shoulder disposed in said passageway for engaging said end of said blade spring to restrict axial movement of said blade spring.

6. The chain tensioner of claim 5, wherein said blade spring has an arcuate shape and said portion of said shoe to which said blade spring is mechanically interlocked being substantially flat, said blade spring being substantially displaced from its arcuate shape to interlock with said shoe, said force in said blade spring acting to keep said shoe under stress.

7. The chain tensioner of claim 6, wherein said end of said blade spring in said passageway retains a slight arcuate shape, said arcuate shape of said end of said blade spring assists in maintaining said blade spring in alignment with said shoulder and in contact with said surface of said passageway adjacent said shoulder.

8. The chain tensioner of claim 5, wherein said length of said blade spring is slightly less than the distance between said outer end of said chamber and said shoulder.

9. The chain tensioner of claim 4, wherein said wall is positioned in said center of said chamber and said projection is positioned in said center of said passageway, said wall and said projection being positioned in said slots in said blade spring when said blade spring is positioned to mechanically interlock with said shoe.

10. The chain tensioner of claim 8, wherein said slots in said blade spring are sufficiently long to allow said blade spring to be positioned in said passageway past said shoulder to allow said other end of said blade spring to be inserted into said chamber, said end of said blade spring engaging said shoulder when said other end of said blade spring has been inserted substantially all the way into said chamber.

11. The chain tensioner of claim 9, wherein said wall and said projection engages said sides of said slots in said blade spring to prevent transverse movement of said blade spring.

12. A chain tensioner comprising:
a blade spring, said blade spring having a longitudinally extending slot positioned at each end of the blade spring, said slots extending from each each of said blade spring towards said center of said spring; and,
a shoe adapted to contact said chain to be tensioned. said shoe being of a synthetic plastic material that will creep under load and elevated temperature, said shoe having a first end and a second end, said first end defining a chamber for receiving one end of said blade spring, said chamber having a wall for engaging said slot on one end of said blade spring, said second end of shoe defining a passageway for receiving an end of said blade spring, said passageway having a projection for engaging said slot on said end of said blade spring, said passageway having a shoulder for engaging said end of said blade spring positioned in said passageway, said shoulder being disposed to maintain said end of said blade spring in engagement with said chamber and said wall at said first end of said shoe to mechanically interlock said blade spring to said shoe so as to place said shoe under stress and maintain tension on said chain.

13. The chain tensioner of claim 12, wherein said synthetic plastic material of said shoe is a rigid nylon.

14. The chain tensioner of claim 12, wherein said blade spring has an arcuate shape and said portion of said shoe to which said blade spring is mechanically interlocked being substantially flat, said blade spring being substantially displaced from its arcuate shape to interlock with said shoe, said force in said blade spring acting to keep said shoe under stress.

15. The chain tensioner of claim 12, wherein said length of said blade spring is slightly less than the distance between said outer end of said chamber and said shoulder.

16. The chain tensioner of claim 12, wherein said slots in said blade spring are sufficiently long to allow said blade spring to be positioned in said passageway past said shoulder to allow said other end of said blade spring to be inserted into said chamber, said end of said blade spring engaging said shoulder when said other end of said blade spring has been inserted substantially all the way into said chamber.

17. A method for mechanically interlocking an arcuate blade spring of a chain tensioner to the shoe of the chain tensioner comprising:
positioning one end of said blade spring in a passageway at one end of said shoe;
displacing said blade spring to align said blade spring with a chamber located on the end of said shoe opposite to said passageway;
advancing said blade spring into said chamber;
aligning said end of said blade spring in said passageway with a means for engaging said end of said blade spring, said engagement means acting to prevent said blade spring from being removed from said chamber and said passageway to mechanically interlock said blade spring to said shoe.

18. The method of claim 17 in which said displaced blade spring applies a force to said shoe, said shoe being a synthetic plastic material that will creep under load and elevated temperature.

19. The method of claim 17, in which said blade spring has a slot positioned on each end of said blade spring, one of said slots engaging a wall in said chamber and said other slot engaging a projection in said passageway when said blade spring is mechanically interlocked to said shoe.

20. The method of claim 17, in which said means for engaging said end of said blade spring is a shoulder located in said passageway, said shoulder being disposed for coming into alignment with said end of said blade spring when said blade spring has been advanced almost all the way into said chamber.

* * * * *